United States Patent
Yenamandra et al.

(10) Patent No.: US 9,354,983 B1
(45) Date of Patent: May 31, 2016

(54) INTEGRATED IT SERVICE PROVISIONING AND MANAGEMENT

(71) Applicant: Entreda, Inc., San Mateo, CA (US)

(72) Inventors: Siddharth Yenamandra, San Mateo, CA (US); Shirish H. Phatak, Bedminster, NJ (US)

(73) Assignee: Entreda, Inc., San Mateo, CA (US)

( * ) Notice: Subject to any disclaimer, the term of this patent is extended or adjusted under 35 U.S.C. 154(b) by 257 days.

(21) Appl. No.: 14/216,239

(22) Filed: Mar. 17, 2014

Related U.S. Application Data

(60) Provisional application No. 61/786,648, filed on Mar. 15, 2013, provisional application No. 61/800,462, filed on Mar. 15, 2013.

(51) Int. Cl.
*G06F 15/167* (2006.01)
*G06F 11/14* (2006.01)
*G06F 17/30* (2006.01)

(52) U.S. Cl.
CPC ........ *G06F 11/1464* (2013.01); *G06F 11/1456* (2013.01); *G06F 11/1458* (2013.01); *G06F 17/30082* (2013.01)

(58) Field of Classification Search
None
See application file for complete search history.

(56) References Cited

U.S. PATENT DOCUMENTS

| | | | |
|---|---|---|---|
| 7,444,398 B1 * | 10/2008 | Matthews | H04L 29/06 370/395.21 |
| 8,489,834 B1 * | 7/2013 | Kumbhari | H04L 67/1097 711/162 |
| 9,118,685 B1 * | 8/2015 | Brocco | H04L 63/102 |
| 9,172,766 B2 * | 10/2015 | Narasimhan | H04L 41/046 |
| 2010/0005505 A1 * | 1/2010 | Gottimukkala | H04L 41/082 726/1 |
| 2010/0071030 A1 * | 3/2010 | Rosenan | G06F 21/552 726/2 |
| 2010/0188975 A1 * | 7/2010 | Raleigh | G06Q 10/06375 370/230.1 |
| 2010/0332456 A1 * | 12/2010 | Prahlad | G06F 17/3002 707/664 |
| 2012/0016778 A1 * | 1/2012 | Salle | G06F 9/5072 705/27.1 |
| 2012/0054625 A1 * | 3/2012 | Pugh | G06F 21/41 715/736 |
| 2012/0084261 A1 * | 4/2012 | Parab | G06F 11/1464 707/654 |
| 2012/0203742 A1 * | 8/2012 | Goodman | G06F 11/1469 707/646 |
| 2014/0122437 A1 * | 5/2014 | Bosson | G06F 17/30 707/652 |
| 2014/0223240 A1 * | 8/2014 | Patil | G06F 11/3034 714/47.1 |

* cited by examiner

*Primary Examiner* — Kenny Lin

(57) ABSTRACT

An integrated infrastructure technology (IT) service provisioning and management framework includes, as framework components, a cloud-based management portal, one or more primary cloud servers, an on-premise cached cloud server gateway appliance, and one or more agents installed on respective on-premise computing devices. Service applications are created by defining a set of interactions between the framework components, including defining a set of service policies and corresponding interactions from the cloud-based management portal wherein at least one of the service policies defines a real-time request for information from an agent. Based at least in part on the information received the agent, a service policy is defined to trigger a data transfer from the agent to the cached cloud server gateway. An off-premise backup policy is defined to enable the cached cloud server gateway to transfer data to a first primary cloud server of the one or more primary cloud servers.

9 Claims, 7 Drawing Sheets

Proposed Solution Topology

Figure 1: Example of current SMB IT environment

Figure 2: Entreda Framework

Figure 3: Proposed Solution Topology

Figure 4: Sample Workflow of SMB user

Figure 5: Sample IT Manager Workflow

Figure 6: Sample hierarchy of console access

INTEGRATED IT SERVICE PROVISIONING AND MANAGEMENT

CROSS REFERENCE TO RELATED APPLICATIONS

This application claims priority to and hereby incorporates by reference the following U.S. Provisional Patent Applications:

| Application Ser. No. | Filing Date | Title |
| --- | --- | --- |
| 61/786,648 | Mar. 15, 2013 | Integrated IT Service Provisioning and Management Platform |
| 61/800,462 | Mar. 15, 2013 | Integrated IT Service Provisioning and Management Platform |

TECHNICAL FIELD

The disclosure herein relates to infrastructure technology provisioning and management.

BACKGROUND

Small and medium-sized businesses (SMBs) utilize a number of point Infrastructure Technology (IT) solutions today. Broadly speaking, IT for small businesses encompass network devices, storage nodes, application or compute elements and client devices. Network devices typically include networking/security products such as DSL/Cable modems, Wireless LAN routers, Network/Application Firewalls, Virtual Private Networking (VPN) concentrators. Storage elements include external storage drives, tape drives as well as data protection/disaster recovery appliances and network-attached storage and file share services. Application or compute elements include on premise-based or hosted servers as well as the range of applications typically used by small businesses. Client devices include Desktop PCs, Mac's, tablets and other types of client devices. These IT functions require high-touch and cumbersome on-premise installation while maintenance/support is conducted on a point product basis either by an IT savvy small business owner/employee, internal IT staff or delegated IT consultant using manual methods or vendor provided, web-based support and maintenance tools for each of these point products or command-line interfaces (CLIs) on a per device per location basis. Serving a large set of locations and devices becomes a practical challenge, highly inefficient and very expensive. Additionally, with rapid advancements in cloud-computing technologies, SMBs now have many options of utilizing multi-tenant cloud-based or internally hosted application services in addition to supporting premise based IT functions such as network devices or client devices which are required for all cases. While hosted, multi-tenant application services provide economic benefits, they magnify provisioning and management challenges especially in hybrid IT environments, as shown, for example, in FIG. 1. In summary, key challenges facing a hybrid small business IT environment include, without limitation: Integration of existing premise-based IT with hosted or cloud based IT frameworks; comprehensive IT services management; unified security and authentication framework for premise and new cloud-based services; automated and delegated IT management and comprehensive monitoring and control functions of all hybrid IT services.

BRIEF DESCRIPTION OF THE DRAWINGS

The disclosure herein is illustrated by way of example, and not by way of limitation, in the figures of the accompanying drawings and in which like reference numerals refer to similar elements and in which.

DETAILED DESCRIPTION

In various embodiments disclosed herein, an IT service provisioning and management platform enables small businesses at a single site or multi-site to take delivery, manage/maintain IT services using a single web-based interface for all services independent of whether these services are delivered on-premise or in a hosted/cloud environment. The intention is to provide enterprise level cloud functionality to small business owners and operators while providing service breadth and "elasticity", i.e. the ability to add a plethora of critical software services and scale capacity on demand. High level goals include, without limitation:

Provide a high performance solution for small businesses, which incorporates a flexible application platform.

Provide a mechanism for delegated IT staff a simple way to provision, manage and monitor the solution.

Figure 2:
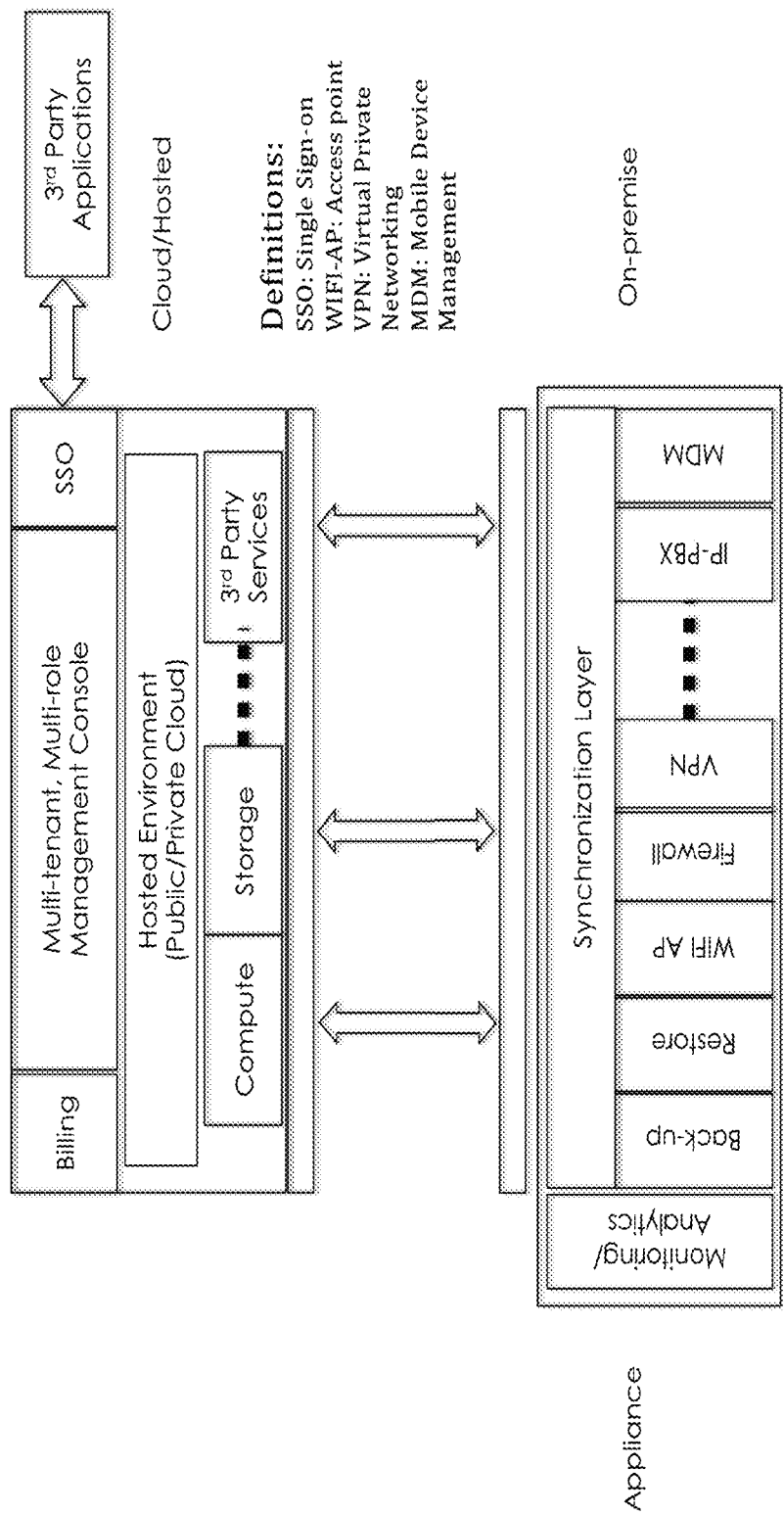
FIG. 2 illustrates an embodiment of a high-level IT topology or "framework."

Leverage hybrid IT topology and economics to provide a framework that allows for the ability to provision services both on-premise or through a hosted or cloud environment FIG. 2 outlines an embodiment of a high level topology or framework. As SMB IT environments generally require some mandatory services to be provisioned on-premise and some services to be optionally delivered through a hosted or cloud environment, the framework developed here reflects as such.

Embodiments of a Proposed Framework

Figure 3:
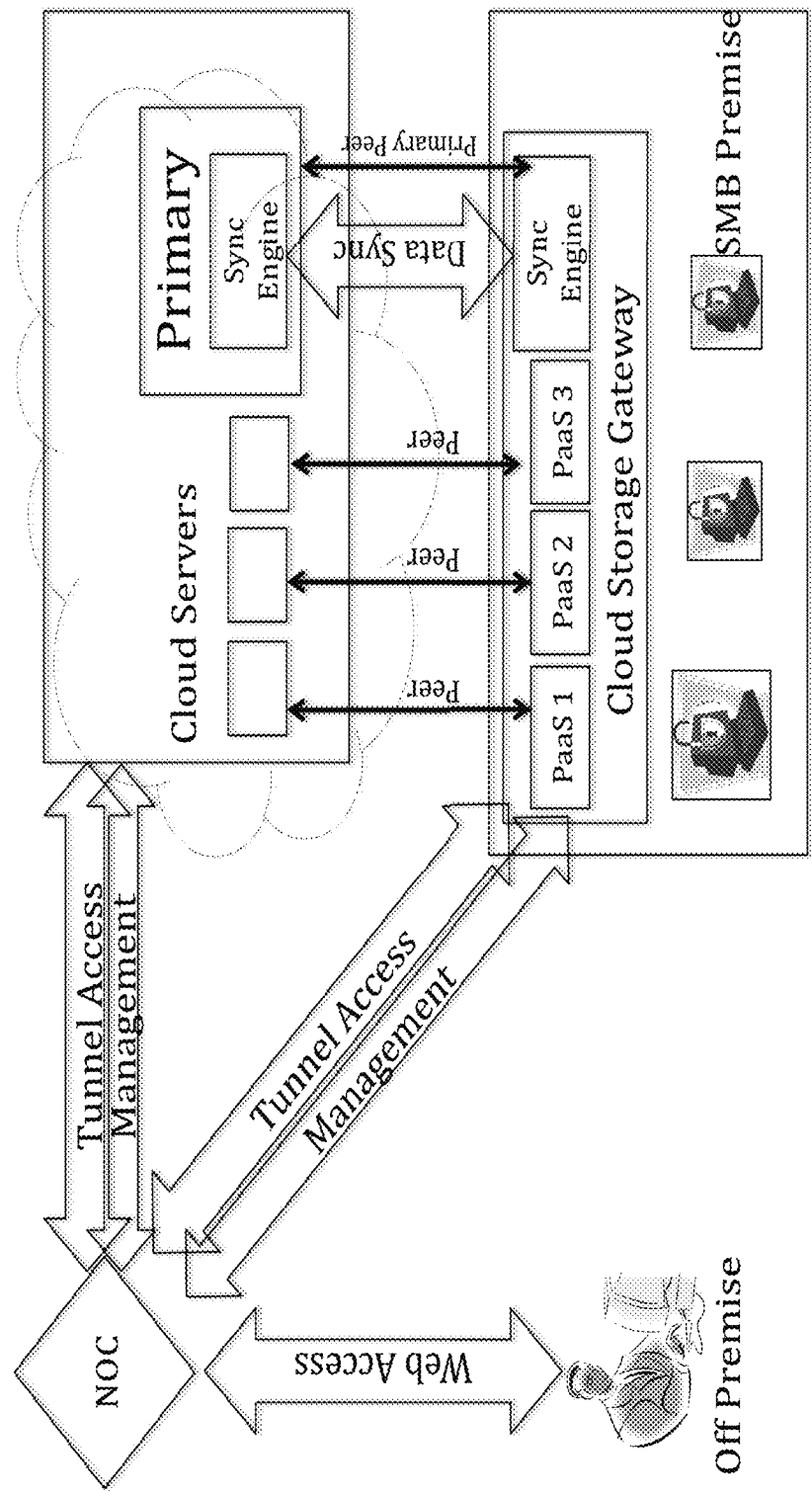
FIG. 3 illustrates a more detailed implementation of an IT framework according to one embodiment.

The framework, implemented in one embodiment, includes the following components as shown, for example and without limitation, in FIG. 3:

Cloud-based or hosted, Centralized Management Portal for scalable service administration One or more Cloud Servers which are virtual machines or compute instances leveraging virtualization technology hosted in the cloud Purpose-built, Hybrid Cloud Server Gateway Appliance Agents installed on on-premise computers such as desktops, laptops and tablets Each of the foregoing components are described in greater detail below.

Centralized Management Portal:

The Centralized Management Portal (also referred to as NOC) framework is the point of provisioning, management and control in one embodiment of the proposed system. The NOC has a multi-level access control mechanism which allows each SMB to have a private virtual environment but at the same time allows partners or delegated IT staff to have a comprehensive view of their whole infrastructure. The NOC is intended as the primary point of control and access in the Entreda system. All provisioning, monitoring and control authoritatively sits on the NOC. In particular, the NOC will handle functions that include, for example and without limitation:

- Authentication, Authorization and Auditing
- Configuration management
- Provisioning and subscription control. In particular even the Cloud Gateway is configured at the NOC (except local network settings).
- Billing
- Control over resources, for example, for spinning up and down Cloud Servers.
- Access to resources, especially the Cloud Servers
- External (of premise) access to the Cloud Server Gateway For programmed access, the NOC also has a REST/SOAP based API. This allows easy integration into third party management tools. In addition, in system components like the Cloud Server Gateway also use these APIs instead of directly interacting with the Cloud Servers. In addition to end user access the NOC is also a point of administration, provisioning and control for the partners. In this context the NOC provides all the functions available to the end customers SMBs as well as the ability to manage the SMBs themselves. In particular, in addition the functions available above, the NOC also provides partners with functions including, for example and without limitation:

- Creation and Deletion of SMB accounts
- Name changes for the accounts
- Policy changes, particularly with respect to billing (for example to change pricing, etc)
- Adding services (in form of Cloud Servers) to an SMB account
- Administrative outsourcing and control Cloud Server:

A Cloud Server is a server instance hosted in the cloud. All services and their corresponding configuration ultimately reside on a Cloud Server. Ultimately, all configuration, management and provisioning functions reside on the Cloud Servers. The Cloud Server Gateways simply act as "caches" for the Cloud Servers. Each Cloud Server Gateway is peered to one or more Cloud Servers using a synchronization protocol. The "Primary" Cloud Server represents a peered instance for the Cloud Server Gateway itself. In essence the infrastructure of the Cloud Server Gateway is replicated or mirrored to the Cloud Server. The cloud instance is spun up and down as needed. For example, if a backup is scheduled to take place, the Cloud Server Gateway will spin up its peer typically from an API exported by the NOC and send modified data to the cloud. Similarly, all recovery or management actions are taken on this Cloud Server. The Cloud Server thus provides disaster recovery capabilities and can be operated as a standalone server in the situations where the Cloud Server Gateway is inaccessible. In situations where the Cloud Server Gateway is replaced, the new appliance configures itself using the Cloud Server instance. The Primary Cloud Server is also unique in that only parts of its data set need be cached on the Cloud Server Gateway. The cache on the cloud server gateway could also be a complete mirror of the data-set that resides in the cloud.

The solution implemented in one embodiment could have remaining peered "Secondary" Cloud Servers as peered instances of local virtual machines hosted on the Cloud Server Gateway platform. As with the primary cloud servers, secondary Cloud Servers are typically in a dormant state and only be spun up when required, which will typically occur when a user tries to access them via the NOC or the Cloud Storage Gateway chooses to spin them up. The system has adequate protection to ensure that only one of the instances (either the one on the Cloud Server Gateway or the corresponding peered Cloud Server) will be active at a time. This simplifies the architecture of the distributed system without having complications around distributed state management and coherence/consistency issues. A Secondary Cloud Server in one embodiment of the proposed solution could be cached "whole" on the Cloud Server Gateway as the base VM image encapsulates all the data and applications required by to provide the service.

The Cloud Server infrastructure is also used to provide service elasticity. For example, if a service requires extra compute capacity that the on premise Cloud Server Gateway is unable to provide, new Cloud Servers can be instantiated. Another example is when more storage needs to be provided: the size of the storage pool on the Cloud Server can be increased without requiring upgrades to the on premises equipment. These are unique attributes of the proposed system.

For legacy applications the Cloud Server infrastructure provides migration capabilities. SMBs can move their existing application infrastructures to virtual machines on the Cloud Server Gateway, which in turn will become Cloud Servers and are managed through the proposed solution. These migrated environments act as Platform-as-a-Service (PaaS) instances: PaaS instances in this case are defined as migrated instances that get their own VM on the Cloud Storage Gateway and a corresponding Cloud Server.

The Cloud Servers are also the key to the Disaster Recovery and Business Continuity services provided by the proposed system. If the on premise environment is somehow compromised (for example, due to a Cloud Server Gateway outage) the Cloud Servers can be spun up and accessed via the NOC without compromising service availability. The key to this is that all application configuration and data sits in the Cloud Server, which in turn implies that it can operate as a fully functional application delivery instance.

It should be noted that Cloud Servers are also the natural encapsulations of data in the system. Data does not "float" in the proposed system; rather it is encompassed by a Cloud Server. On the Primary Cloud Server, for example only part of the data associated with the cloud server may be cached on the Cloud Server Gateway. This example illustrates the use case where elastic backup services need to be provided.

It should be noted that Cloud Servers are designed to be rarely running on the public cloud. Rather they are to be run generally on the Cloud Server Gateway except under special circumstances (appliance failure or resource overrun). In fact, policies can be set to encrypt all data in the public cloud including the Secondary Cloud Server Images. In this scenario the Cloud Server can only be instantiated on a Cloud Server Gateway. Note that the Primary Cloud Server must be instantiated on the cloud; though it is the only cloud server with this requirement. This is required to ensure that synchronization servers (described later) can run properly. However all data within the Primary Cloud Server (e.g. for backup) can be encrypted.

Cloud Server Gateway:

The Cloud Server Gateway (CSG) is an appliance that is physically located on the customer premises. It acts as the on premise component of the proposed solution. This appliance provides acceleration functionality in order to enhance user perception of the cloud services. This appliance also provides a local point of control, e.g. local machine policies will be enforced here and local backups would happen at the Cloud Server Gateway. User policies are enforced both online at the Cloud Server as well as locally at the Cloud Server Gateway except that the actual configuration of the policies only happens at the Cloud Server. The Cloud Server Gateway should be considered as the acceleration/caching point in the network that is fully peered to one or more Cloud Server instances and that in effect does not have an independent identity. In particular any policies, access management and configuration are all done at the Cloud Server and replicated to the Cloud Server Gateway. One embodiment of the proposed solutions calls for the gateway to locally cache the policies and configurations and can thus operate without having to contact the Cloud Server for each step.

Topologically, the Cloud Server Gateway in one embodiment of the proposed solution could act as the physical gateway for the SMB premises. As such it must include typically edge router functions such as firewalls and WAN/LAN access components. As a result of this deployment choice, the Cloud Storage Gateway has the ability to perform network discovery and act as a point of policy enforcement and control. For example, if the policy requires each connected desktop, laptop or tablet device to have certain settings or have a certain piece of software installed, the gateway can easily enforce this policy by denying access until the policy is followed. This is very useful in scenarios where the service also requires a client side component which must be installed on every connected computer on the network. An example is the backup service which requires a client side component on each system that needs to be backed up.

The management of the Cloud Server Gateway takes place through the NOC. In particular, all configuration, management and monitoring functions are performed via the NOC (even if the administrator is managing the Cloud Storage Gateway on premises). Remote access from outside the customer premises to the gateway is also provided by the NOC. The Cloud Server Gateway maintains a reverse tunnel to the NOC to enable this functionality. This function can also be used to provide private cloud like capabilities on the Cloud Server Gateway; policies can be used to force certain services only to run on the Cloud Server Gateway.

The core of the Cloud Server Gateway is a synchronization engine that synchronizes local changes to the cloud. Changes to the Cloud Server Gateway itself are synchronized to the Primary Cloud Server. This may not be a full replication as there will be components of the Cloud Server Gateway that may not be synchronized (e.g. network and local topology information). For the other Secondary Cloud Servers, any changes to the corresponding disk image files will be synchronized to the cloud. As such the Secondary Cloud Servers always represent point in time snapshots of the running PaaS or Platform-as-a-Service instances on the Cloud Server Gateway.

The Cloud Server Gateway functions as a massive cache for all data and VM Images in the cloud (in this respect, the VM images are treated as specialized data). Most VMs are instantiated on the Cloud Server Gateway is cached here. However, in situations where application and performance elasticity are required, the Cloud Server Gateway or the NOC can also instantiate the PaaS instances on a cloud provider's infrastructure directly. Since VMs can run either on the Cloud Server Gateway or the public cloud, policies can be used to drive exactly what must run on the Cloud Server Gateway and what may run on the public cloud and the affinity of various VMs to the public cloud or the Cloud Server Gateway. Without explicit policies, the applications will run on the Cloud Server Gateway, unless the Cloud Server Gateway runs out of resources.

The Cloud Server Gateway should not be considered a first class component of the proposed system. In particular, the system will be fully functional albeit with degraded performance even without the Cloud Storage Gateway. The gateway caches all the data, metadata including VM images, and the entire configuration; and as with any cache is designed to be easily replaceable. Nevertheless, the gateway is critical in terms of solving the performance, reliability and availability issues that plague typical cloud solutions. As such it is a key component in the solution. In addition, in security conscious environments, the Cloud Server Gateway also provides a security boundary, in effect providing private cloud like semantics backed by a public cloud infrastructure. This is also a unique attribute of the proposed system.

Agents:

Agents are specialized software applications or daemons designed to provide tighter integration of the services provided by the Cloud Server Gateway with on premise computer systems such as desktops, laptops and tablets. This is required for certain services such as backup which must access machine state or storage directly. These can also be used to provide application migration capabilities. The agents are cross platform (or are ported across multiple platforms) and are "physically" installed onto the target machines (i.e. these are not SaaS components). These agents automatically peer with the local Cloud Server Gateway using implicit (making a special connection to the NOC and having the Cloud Server Gateway intercept it) and/or explicit (having the local IP address of the Cloud Server Gateway) discovery protocols. All agent policies are automatically configured by the Cloud Server Gateway. In addition, the Cloud Server Gateway can enforce specific policies for security and compliance purposes. Another use for agents is to facilitate P2V (Physical to Virtual) application migrations. Application servers can be converted to Cloud Server VMs using automated P2V tools. (If the servers are already running as VMs, the VMs can simply be migrated to become Cloud Servers.)

System Interactions Between Various Components of the Proposed Solution/Framework:

Each of the components described above is designed to interact in a well-defined fashion to provide the full functioning of the system.

- Agents interact with the Cloud Server Gateway or the NOC. When an agent makes a direct connection to the NOC, the Cloud Server Gateway will intercept such connections.
- The Cloud Server Gateway will interact with the Cloud Servers to provide full state backup (including all user and application data). In addition, the policies will be authoritatively stored by the Cloud Servers and will be replicated to the Cloud Server Gateway. As such the Cloud Server Gateway will act as a (write-behind and read-ahead) cache for the Cloud Servers.
- The NOC will interact with the Cloud Servers for policy management and provisioning.

As new applications are provisioned and configured the Cloud Serves provide the authoritative storage for new applications and settings which will in turn be replicated to the Cloud Server Gateway. To avoid complex topologies the NOC will generally configure the Cloud Server and not the Cloud Server Gateway (though configuration of the Cloud Server Gateway may be supported, for example, where direct access the Cloud Server Gateway from outside premises be desired).

The NOC will interact with the Cloud Storage Gateway for monitoring and some management (for example changing IP addresses or connecting to a new network).

In terms of user interactions, the user will interact with the gateway on premise or the NOC directly off premise. There is no direct interaction with the Cloud Servers, these will be brokered by the CSG or by the NOC. The NOC/CSG will automatically spin up the Cloud Servers when they are required. Spin-up and spin-down capabilities should be provided by the NOC as services and used by components of the system.

Other Considerations/Extensions

Bandwidth and transaction costs: Since most cloud providers charge for bandwidth and transactions, the embodiments disclosed herein are carefully engineered to reduce the bandwidth usage and to provide watermarks for business owners to control expenses.

Distributed processing: By its very nature distributed processing requires distributed application state management which in turn requires specialized modifications to most applications. As one solution to this is to only access the services at a single point at any given time and use the distributed peers in a hot-standby configuration (i.e. one node is passive but all changes are replicated). Over time a more comprehensive solution can be developed for truly distributed applications.

Offline access: The desire is to provide offline access to end users. Unfortunately, offline access is fundamentally antagonistic to true distributed processing capabilities. A solution is to use an escrow like model with limited term leases; however the issues of conflict detection and resolution will pose a challenge to any system that allows for multi-site distributed updates to disconnected systems. Extensions for offline access may be deployed on an application by application basis.

SaaS applications: By their very nature most SaaS applications are not amenable to distributed hosting (i.e. hosting at both the Cloud Server and Cloud Server Gateway). This problem is solved in at least two ways: 1. Create specialized SaaS applications that can run in a distributed fashion or 2. Host the applications on the cloud and provide acceleration and caching features.

Encryption: Data sent to the cloud can be encrypted. However, it should be noted that the Cloud Servers generally need access to the unencrypted data to provide the necessary services. This will require integration with a key escrow system to provide the appropriate access.

Figure 6:
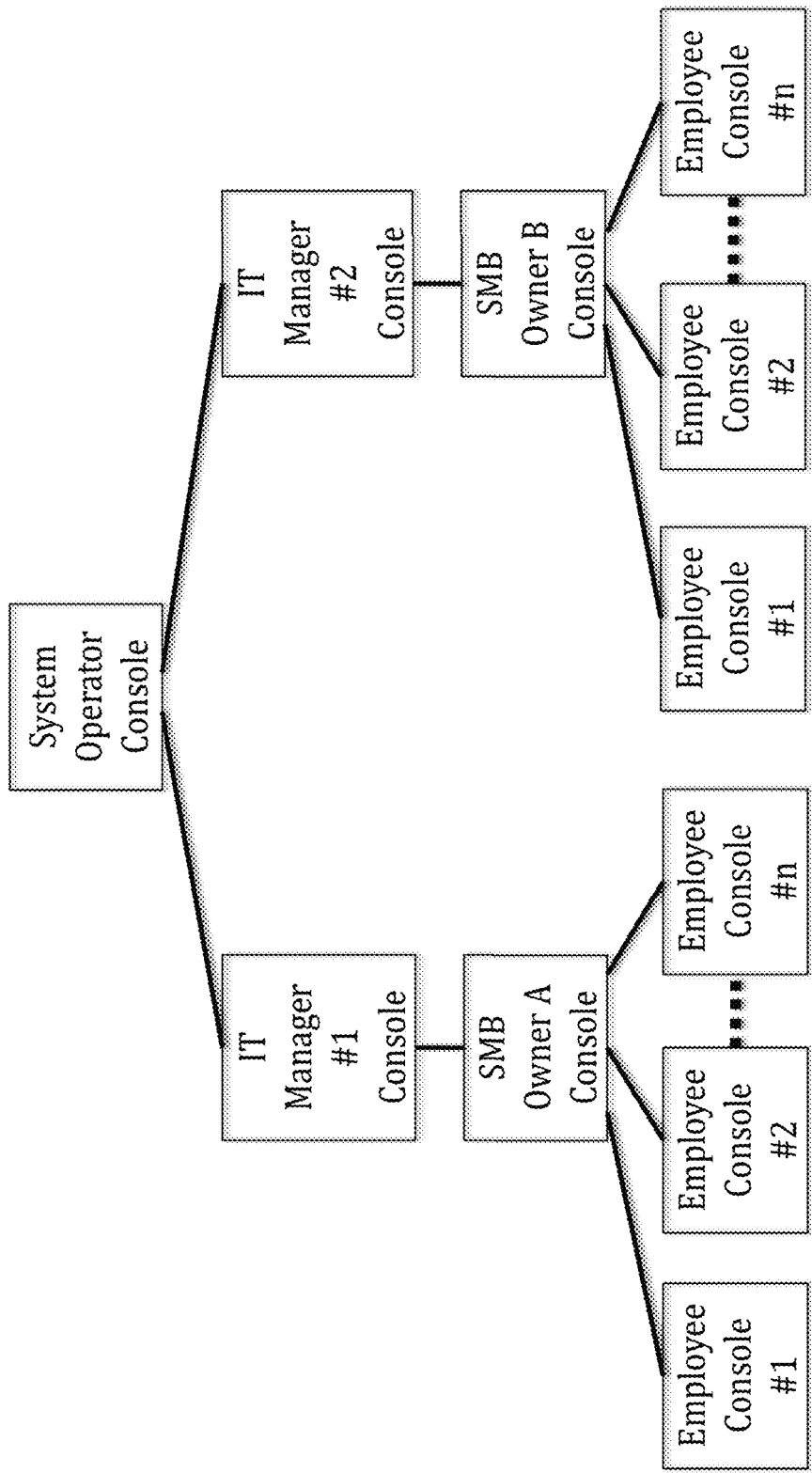
FIG. 6 illustrates an exemplary hierarchy of console access within embodiments of IT frameworks disclosed herein.

Example Work-Flow of Various Users Access the Web Console:

In one embodiment, four distinct user categories are defined as indicated, for example, in FIG. 6. The employee view has minimum visibility while the system operator has complete end-to-end view of all users and network topologies as well as the ability to provision and manage the entire system end-to-end.

Figure 1:
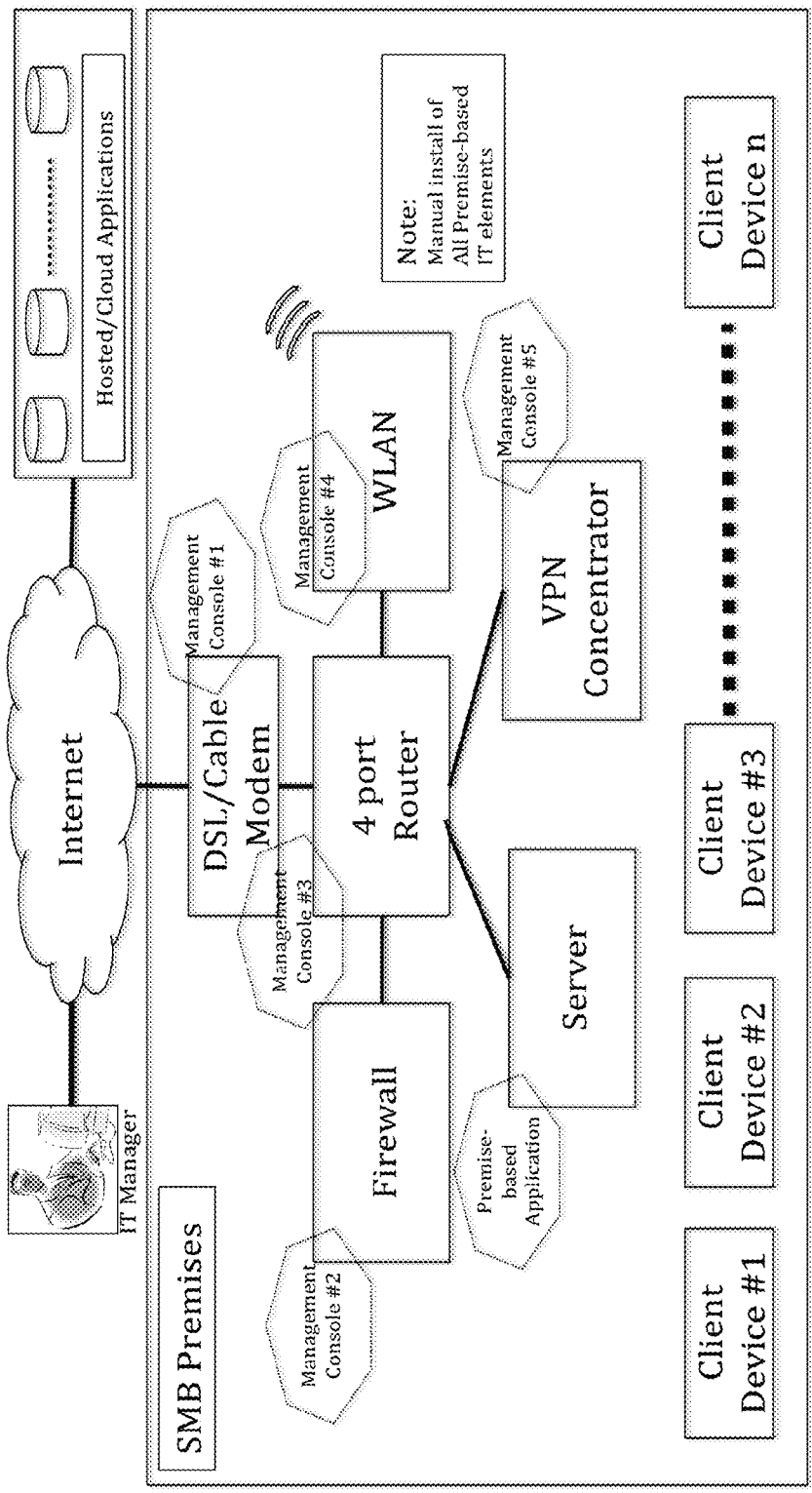
FIG. 1 illustrates an example of a conventional SMB IT environrment.
Figure 4:
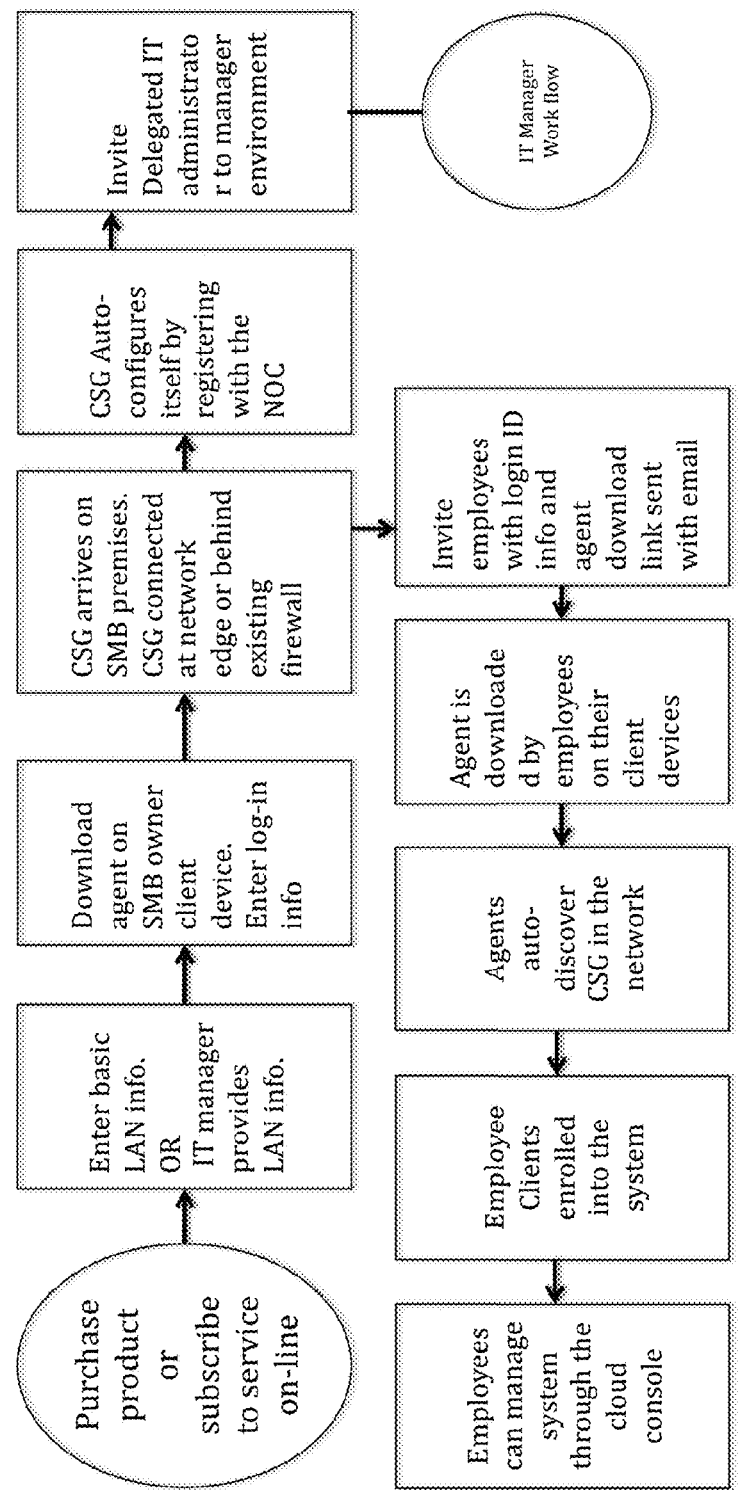
FIG. 4 illustrates an exemplary workflow of an SMB user within embodiments of IT frameworks disclosed herein.

The exemplary work-flow described in FIG. 4 illustrates the simplicity of the install and management model in contrast to manually intensive install and support models indicated in FIG. 1.

Figure 5:
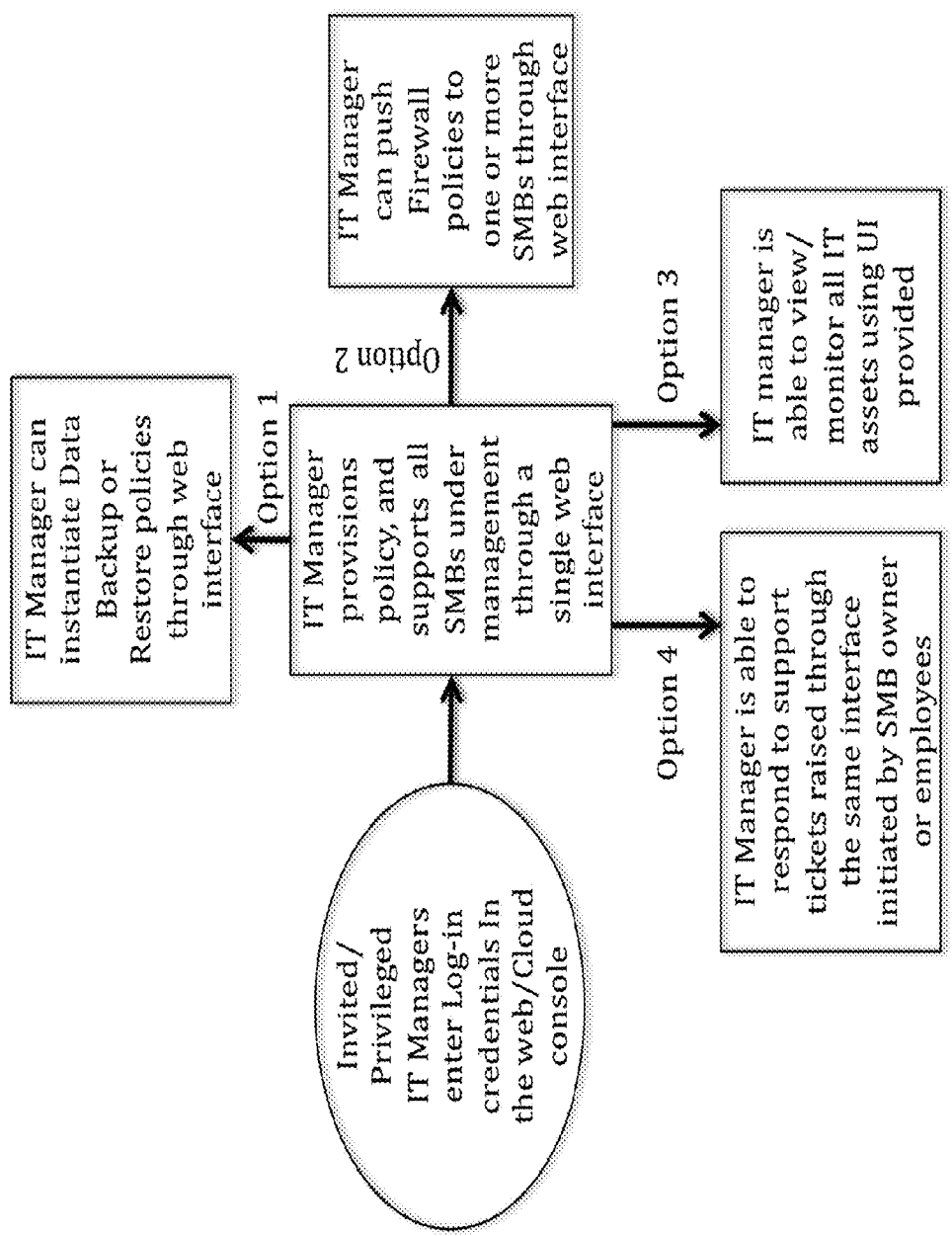
FIG. 5 illustrates an exemplary workflow of an IT manager within embodiments of IT frameworks disclosed herein.

The exemplary work-flow described in FIG. 5 illustrates a few examples of what an IT manager is able to accomplish through the console.

Figure 7:
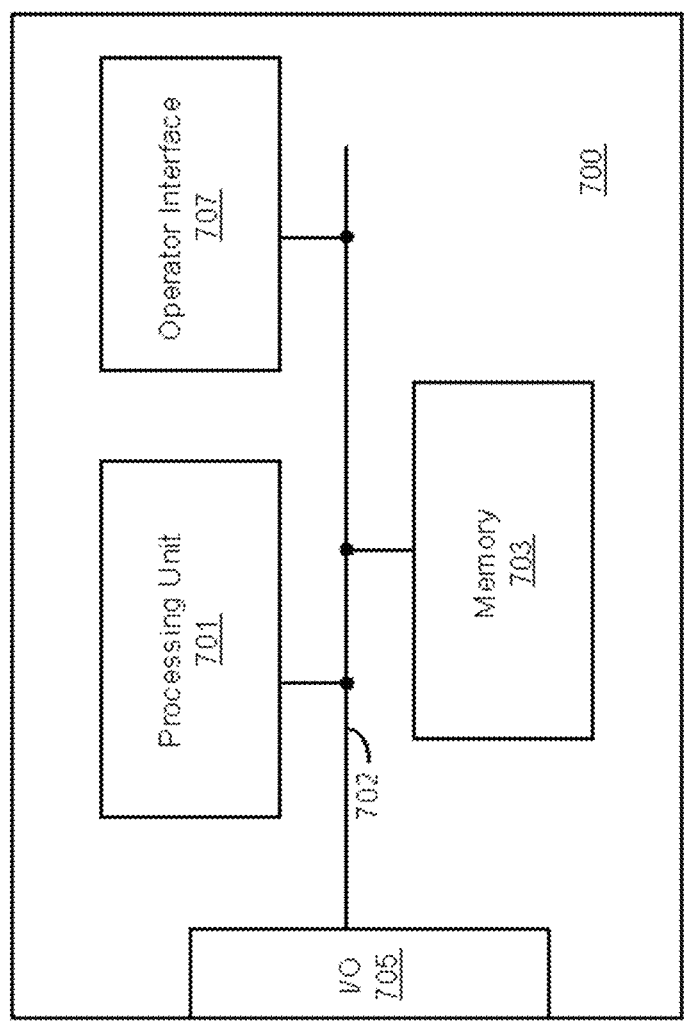
FIG. 7 illustrates a generalized embodiment of a computing device that may be used to implement the various servers, clients, appliances or other devices in which various operations may be executed within embodiments of IT frameworks disclosed herein.

FIG. 7 illustrates a generalized embodiment of a computing device 700 that may be used to implement the various servers, clients, appliances or other devices in which the various operations described above may be executed. As shown, computing device 700 includes a processing unit 701, memory 703 for storing program code executed by the processing unit to effect the various methods and techniques of the above-described embodiments, and also to configuration data or other information for effecting various programmed or configuration settings in accordance with the embodiments described above. Note that the processing unit itself may be implemented by a general or special purpose processor (or set of processing cores) and thus may execute sequences of programmed instructions to effectuate the various operations described above, as well as interaction with a user, system operator or other system components.

Still referring to FIG. 7, computing device 700 further includes one or more input and/or output (I/O) ports 705 for receiving and outputting data (e.g., various wireless communications interfaces in accordance with communications standards referenced above), and a user interface 707 to present (display) and receive information to a human or artificial operator and thus enable an operator to control server-side and/or client-side inputs in connection with the above-described operations. Though not shown, numerous other functional blocks may be provided within computing device 700 according to other functions it may be required to perform and the computing device itself may be a component in a larger device, server or network of devices and/or servers. Further, the functional blocks within computing device 700 are depicted as being coupled by a communication path 702 which may include any number of shared or dedicated buses or signaling links. More generally, the functional blocks shown may be interconnected in a variety of different architectures and individually implemented by a variety of different underlying technologies and architectures. With regard to the memory architecture, for example, multiple different classes of storage may be provided within memory 703 to store different classes of data. For example, memory 703 may include non-volatile storage media such as fixed or removable magnetic, optical, or semiconductor-based recording media to store executable code and related data, volatile storage media such as static or dynamic RAM to store more transient information and other variable data.

The various methods and techniques disclosed herein may be implemented through execution of one or more a sequences of instructions (i.e., software program(s)) within processing unit 701, or by a custom-built hardware ASIC (application-specific integrated circuit), or programmed on a programmable hardware device such as an FPGA (field-programmable gate array), or any combination thereof within or external to processing unit 701.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of components, communication techniques, component types or devices and the like can be different from those described above in alternative embodiments. The term "coupled" is used herein to express a direct connection as well as a connection through one or more intervening circuits or structures. Device or circuit "programming" can include, for example and without limitation, loading a control value into a register or other storage circuit within the device in response to a host instruction (and thus controlling an operational aspect of the device and/or establishing a device configuration) or through a one-time programming operation. The terms "exemplary" and "embodiment" are used to express an example, not a preference or requirement.

The section headings provided in this description are for convenience of reference only, and in no way define, limit, construe or describe the scope or extent of such sections. Also, while various specific embodiments have been disclosed, it will be evident that various modifications and changes may be made thereto without departing from the broader spirit and scope of the disclosure. For example, features or aspects of any of the embodiments may be applied in combination with any other of the embodiments or in place of counterpart features or aspects thereof. Accordingly, the specification and drawings are to be regarded in an illustrative rather than a restrictive sense.

What is claimed is:

1. A method of operation within an integrated infrastructure technology (IT) service provisioning and management framework that includes, as framework components, a cloud-based management portal, one or more primary cloud servers, an on-premise cached cloud server gateway appliance, and one or more agents installed on respective on-premise computing devices, the method comprising:

creating one or more service applications by defining a set of interactions between two or more of the framework components, including defining a set of service policies and corresponding interactions from the cloud-based management portal wherein at least one of the service policies defines a real-time request for information from the one or more agents;

receiving the information from the one or more agents;

based at least in part on the information received from the one or more agents, defining a service policy that triggers implementing any one or more service policies of the set to trigger a data transfer from the one or more agents to the cached cloud server gateway; and defining an off-premise backup policy to enable the cached cloud server gateway to transfer data to a first primary cloud server of the one or more primary cloud servers.

2. The method of claim 1 further comprising extending the on-premise cached cloud server gateway appliance, after on-premise deployment, to include at least one of additional networking services, additional data storage services or additional executable-application services.

3. The method of claim 1 further comprising extending the cloud-based management portal to support one or more third-party software-as-a-service (Saas) services.

4. The method of claim 1 further comprising extending the cloud-based management portal to support execution of one or more software applications on virtual servers hosted either on-premise or in the cloud.

5. The method of claim 1 further comprising accessing any one of the framework components via a secure web-based interface.

6. The method of claim 1 wherein creating one or more service applications by defining a set of interactions between two or more of the framework components comprises defining at least one of a time-based interaction, an event-based interaction, an interaction that is time-based and event-based, or at least one time-based interaction in combination with at least one event-based interaction.

7. The method of claim 1 wherein the real-time request for information from one or more of the agents comprises a request for Operating System (OS) information.

8. The method of claim 1 wherein the real-time request for information from the one or more agents comprises a list of active processes being executed by the one or more agents.

9. The method of claim 8 wherein at least one of the active processes in the list of active processes being executed by the one or more agents comprises an application program.

\* \* \* \* \*